United States Patent Office 3,368,973
Patented Feb. 13, 1968

3,368,973
EXTREME PRESSURE LUBRICANTS
Carl E. Johnson, Glen Ellyn, Ill., assignor to Nalco Chemical Company, Chicago, Ill., a corporation of Delaware
No Drawing. Filed May 11, 1965, Ser. No. 454,965
6 Claims. (Cl. 252—49.8)

ABSTRACT OF THE DISCLOSURE

The instant invention pertains to the use of the reaction product of phosphorous acid and lanolin as a primary component for an extreme pressure lubricant.

---

The instant invention pertains to lubricants and more particularly to extreme pressure lubricants.

In lubrication under non-hydrodynamic conditions a degree of metal contact through the oil film always occurs. This generally results in formation of welded junctions and tearing of metal on a microscopic scale. Particularly at high loading and under elevated temperatures more contacts result, leading to increased plastic deformation and enhanced welding. When such a situation occurs seizure results on a large deleterious scale.

For example, under conditions of both high pressure and high rubbing velocity as occurs in many types of gears, such as hypoid gears and with heavily loaded bearings, it becomes increasingly difficult to maintain the desired thin film of lubricant between the contacting surfaces. With failure or rupture of lubricant film, deformation of mating high spots occurs.

The metal-to-metal contact under such situations results in localized welding. As the surfaces move relative to one another the weld is sheared and particles of metal removed. After a certain duration of time the contacting surfaces become rough and pitted and eventually fail by seizing or scoring. The same situation occurs in forming coils of relatively heavy gauge metal from continuous strips at a pickle line. Certain portions of the metal coils work against each other, and when the lubricant film breaks, extreme scratching of the strip results. The above undesirable situation particularly occurs when relatively heavy coils of metal are made weighing several tons or more. Extremely high localized pressures and temperatures occur which causes excessive gouging or scratching of segments of the heavy coil. Thus, if for example, the coiled sheets of metal are to be subsequently employed in a finished object such as a car body, these materials would be rejected because of unseemly appearance.

Under such conditions of high temperature and pressure leading to undesirable welding or scratching, the only practical method of combating these problems is to increase the tenacity of the lubricant film. Thus, special types of lubricants must be developed for use under these conditions. These are known as "extreme pressure" or E.P. lubricants. These so-called extreme pressure lubricants are made by adding special E.P. agents to lubricating oils or to greases. Often additional agents are also added such as oily materials and anti-corrosion agents. The extreme pressure lubricant films function by providing layers of lower shear strength which prevent metal tearing, and also act as fluxing agents which contaminate the metal surface and thereby prevent welding.

It therefore becomes an object of the instant invention to provide an extreme pressure lubricant additive.

Another object of the invention is to provide an extreme pressure lubricant containing the above additive. Other objects and a fuller understanding of the invention can be had by reference to the following description of the invention taken in conjunction with the appended claims.

In accordance with the present invention an extreme pressure lubricating composition has been discovered which has an exceptionally high load-carrying capacity or passing load. The extreme pressure lubricating composition particularly useful in inhibiting wear, scuffing and seizure of engaging metal parts or metal pieces comprises a major portion of a lubricant which is either a fluid lubricating oil or grease and a minor portion of a novel extreme pressure additive comprising the reaction product of lanolin and phosphorous acid. The lubricating composition of the invention has exceptional ability to maintain its lubricating activity even under conditions of high temperature and pressure.

The base lubricating oils or greases with which the novel extreme pressure additives of the present invention are used may be chosen from a wide variety of conventional materials which exhibit lubricant properties. For example, the base oils may be hydrocarbon lubricating oils or synthetic lubricating oils or mixtures of these in various proportions. For example, the hydrocarbon oils may include mineral oil, vegetable and animal oils such as paraffin bases, naphthene bases or mineral base oils of the residual or distillate type. The mineral lubricating base oils of the type just described have a viscosity which generally ranges from about 80 to about 1000 SUS at 100° F. A paraticular oil of this type is a paraffin base oil which has been solvent dewaxed and clay percolated. Other preferred lubricants include straight mineral lubricating oils or distillates, bright stock residua and the like.

Synthetic lubricating base oils may also be employed with success. Typical examples of these include high molecular weight polyalkylenes, such as polybutene, high molecular weight, high boiling liquid aliphatic dicarboxylic acid esters, such as di-2-ethylhexyl sebacate, etc. Other useful synthetic oils includes polyglycols and polyester lubricants. Sulfur analogues of any of the above-described diesters, polyesters, and polyalkylene ethers may also be usefully employed in formulating the lubricating compositions of this invention. Hydrogenated oils are another typical synthetic lubricating oil. Also, greases derived from any of the above fluid lubricants may be employed as useful extreme pressure lubricants when used in combination with the lanolin-phosphorous acid E.P. agents.

The novel E.P. agent used in the extreme pressure lubricating composition of the invention is a reaction product of lanolin and phosphorous acid. This material can be readily prepared by merely reacting the two ingredients at room temperature or under slightly elevated temperatures to promote a quicker reaction. The respective ingredients may be employed in wide range of weight percentages based on total weight of the final product. However, it is preferred that 5–15% by weight of phosphorous acid be reacted with about 85–95% by weight of lanolin. Again, the above-described reaction product may be present in the extreme pressure lubricating compositions in varying amounts depending upon the particular end-use of the lubricant. Greatly preferred lubricating compositions comprise 1.5%–10% by weight of the extreme pressure additive.

The lubricating compositions of the invention may contain other additives such as are conventionally employed in lubricating oils such as detergents, anti-oxidants, viscosity improvers, anti-foam agents, corrosion inhibitors, etc. A typical anti-oxidant is an alkyl-substituted phenol such as 2,6-di-tertiary butyl-4-methyl phenol. A useful class of anti-rust compounds is the alkyl-substituted aliphatic dicarboxylic acids such as alkenyl-succinic acids, etc. A typical anti-foamer may be selected from the organic silicon class such as dimethyl silicon.

In order to demonstrate the high load-bearing capacity imparted to lubricants by addition thereto of the phosphorous acid-lanolin composition of the invention the following test was run. Lubricating compositions containing E.P. agents were subjected to the Timken load-bearing test in the Timken Lubricant Tester in which a hardened steel ring rotating at 800 r.p.m. was flooded by the test lubricating composition, while a hardened steel block was pressed against it by a system of weights and levers. Two specific compositions were prepared. The first, Composition A, was comprised of 20% by weight of fatty material including fatty acid and triglycerides thereof, 77.5% by weight of a waxy hydrocarbon oil and 2.5% of an extreme pressure lubricant additive derived from reaction of 10% phosphorous acid and 90% lanolin. This lubricant composition as run in the above test did not produce scoring of the block at a 30 pound load after a run of approximately 10 minutes. In another test run a lubricating composition, Composition B, comprising 20% by weight of fatty material, 78% by weight of waxy hydrocarbon oil and 2% by weight of a reaction product derived from 7% by weight of phosphorous acid and 93% by weight of lanolin also passed the 30 pound load test. A blank run involving the above materials, but without benefit of phosphorous acid-lanolin E.P. additive could only be run at about 12–13 pounds. Higher loads resulted in severe scoring.

The excellent load-bearing capacity imparted to lubricants by the lanolin-phosphorous acid additives was surprising and unexpected when considered with the fact that various other analogous materials did little to increase the load-bearing capacity of base lubricants. Such materials as the reaction product of phosphoric acid and lanolin, phosphated castor oil, phosphated oleyl alcohol, and phosphated amine compounds did little to improve performance of the test lubricating oil, and in most instances showed little better than a blank lubricant material containing no additive.

In an actual plant run a typical lubricating composition of the invention was tested for its ability to prevent scoring or scratching of a 0.09 heavy gauge steel strip being rolled into an approximate 15 ton coil. Specifically, the lubricant composition made up contained 21.0% fatty material, 2.0% of a reaction product of 7% phosphorous acid and 93% lanolin, 1.0% emulsifier, 74.0% of waxy hydrocarbon and 2.0% of a reaction product derived from 8% phosphorous acid and 92% lanolin. The above was employed as the lubricating media during the actual rolling operation. Excellent lubricant protection was afforded during the whole of the operation and substantially no scratching or gouging occurred on the surface of the rolled strips. Heretofore, even with benefit of conventional E.P. prior art additives in lubricating fluid bases, considerable harm to the metal surface had been done during the coiling operation.

It will be appreciated that various modifications and changes in addition to those set forth above may be made in the above compositions without departing from the spirit of the invention and accordingly the invention is to be limited only within the scope of the appended claims.

What is claimed is:

1. An extreme pressure lubricating composition for inhibiting wear, scuffing and seizure of engaging metals which comprises a major portion of a lubricant selected from the group consisting of fluid lubricants and greases and a minor effective amount of an extreme pressure additive comprising the reaction product of lanolin and phosphorous acid.

2. The composition of claim 1 wherein said extreme pressure additive is present in an amount ranging from about 1.5% to about 10.0% based on the weight of the lubricant.

3. The composition of claim 1 wherein said lubricant is a hydrocarbon lubricating oil.

4. The composition of claim 2 wherein said extreme pressure additive is the reaction product of 5–15% by weight of phosphorous acid and 85–95% by weight of lanolin.

5. An extreme pressure lubricant additive comprising the reaction product of lanolin and phosphorous acid.

6. The extreme pressure lubricant additive of claim 5 wherein said reaction product comprises 5–15% by weight of phosphorous acid and 85–95% by weight of lanolin.

References Cited

UNITED STATES PATENTS

| 2,285,855 | 6/1942 | Baxter et al. | 252—49.8 |
| 2,466,393 | 4/1949 | Dickey et al. | 260—403 |

OTHER REFERENCES

"Wool Wax" by Gillespie, Hobart Pub. Co., Washington, D.C., 1948, pp. 48, 55, and 56.

DANIEL E. WYMAN, *Primary Examiner.*

I. VAUGHN, *Assistant Examiner.*